United States Patent [19]

Iwai

[11] Patent Number: 5,198,855

[45] Date of Patent: Mar. 30, 1993

[54] EXPOSURE COMPENSATION DEVICE OF CAMERA

[75] Inventor: Fumio Iwai, Omiya, Japan

[73] Assignee: Fuji Photo Optical Company, Limited, Saitama, Japan

[21] Appl. No.: 840,176

[22] Filed: Feb. 24, 1992

[30] Foreign Application Priority Data

Feb. 26, 1991 [JP] Japan .................................. 3-53219

[51] Int. Cl.⁵ .............................................. G01B 15/05
[52] U.S. Cl. .................................. 354/414; 354/415; 354/419; 354/421; 354/422; 354/137
[58] Field of Search ............... 354/413, 414, 415, 419, 354/420, 421, 422, 423, 137

[56] References Cited

U.S. PATENT DOCUMENTS

| | | | |
|---|---|---|---|
| 4,058,818 | 11/1977 | Johnson et al. | 354/137 X |
| 4,316,658 | 2/1982 | Bundschuh et al. | 354/423 |
| 4,354,748 | 10/1982 | Grimeo et al. | 354/422 |
| 4,427,276 | 1/1984 | Feinerman et al. | 354/413 |
| 4,459,005 | 7/1984 | Harvey | 354/423 |
| 4,801,964 | 1/1989 | Desormeaux | 354/414 |
| 4,878,081 | 10/1989 | Kishida et al. | 354/414 |
| 4,970,537 | 11/1990 | Tsuboi | 354/413 X |
| 5,017,955 | 5/1991 | Kotani | 354/419 X |
| 5,019,853 | 5/1991 | Sato et al. | 354/420 |
| 5,117,252 | 5/1992 | Ellwood et al. | 354/415 |

Primary Examiner—W. B. Perkey

[57] ABSTRACT

An exposure compensation device of a camera used jointly with an electronic flash has a plurality of exposure compensation modes and electronic flash modes preset to each of the exposure compensation modes. In each exposure compensation mode, a compensation value for compensating an exposure value and an electronic flashing point is set. When an exposure compensation mode is requested by an external operation, the exposure compensation device selects a required exposure compensation mode based on results of light measurement and distance measurement, compensates an exposure value and an electronic flashing point corresponding to the results of light measurement and distance measurement by means of the compensation value of the selected exposure compensation mode, and sets an electronic flash mode corresponding to the selected exposure compensation mode. Therefore, an operation of exposure compensation using an electronic flash is made easier, and, the contents of exposure compensation using an electronic flash is changed automatically.

8 Claims, 5 Drawing Sheets

EXPOSURE COMPENSATION DEVICE OF CAMERA

BACKGROUND OF THE INVENTION

Field of the Invention

The present invention relates to an exposure compensation device of a camera, and in particular, relates to an exposure compensation device which is used jointly with an electronic flash.

Description of the Background Art

As it is well-known, in an automatic exposure camera, an optimal exposure cannot be obtained for an object pictured with a back light and an object pictured with an extreme distribution of bright and dark points. Because of this, an ordinary automatic exposure camera is equipped with an exposure compensation switch for compensating an exposure value corresponding to a result of a light measurement by a predetermined value so that an exposure compensation can be performed by operating this exposure compensation switch. Since merely a compensation of the exposure value is performed by such an exposure compensation, an imaged picture becomes dark in regard to an object pictured with a back light and an object pictured with an extreme distribution of bright and dark points, wherein picture quality is degraded. To cope with such an inconvenience, some camera users also use an electronic flash therewith by setting an ON mode of an electronic flash manually in addition to the above-mentioned exposure compensation, aiming at an improvement of the picture quality.

Thus, as an operation of the exposure compensation switch as well as a selection to the ON mode of the electronic flash are necessary for improved picture quality using an ordinary automatic exposure camera in the case of a back light and so on, resulting in difficult camera operation for ordinary camera users. Conventionally, an exposure compensation has been applied generally to an object pictured with a back light or an object pictured in the shade, but it is possible to obtain a high grade quality picture by an exposure compensation used jointly with an electronic flash in other cases as well. From a viewpoint like this, it is desirable to make it easy to take high grade quality picture even for camera users who are not familiar with nor experienced with how to use a camera, by automatically changing the contents of an exposure compensation used jointly with an electronic flash in accordance with a pictured object.

SUMMARY OF THE INVENTION

It is an object of the present invention to provide an improved exposure compensation device of a camera used jointly with an electronic flash.

Another object of the present invention is to provide an exposure compensation device of a camera which can perform an exposure compensation using an electronic flash with more simple operation.

Still another object of the present invention is to provide an exposure compensation device of a camera which can change the contents of a exposure compensation used jointly with an electronic flash automatically.

The above and other objects are attained by an exposure compensation device of camera used jointly with an electronic flash comprising exposure compensation mode requesting means, responsive to an external operation, for requesting an exposure compensation mode; exposure compensation means having a plurality of exposure compensation modes in which a compensation value for compensating an exposure value and an electronic flashing point are set respectively, said exposure compensation means responsive to the request of the exposure compensation mode from said exposure compensation mode requesting means for selecting an exposure compensation mode to be required based on the results of light measurement and distance measurement, and for compensating an exposure value and an electronic flashing point corresponding to the results of light measurement and distance measurement by means of the compensation value of the selected exposure compensation mode; and electronic flash mode setting means having electronic flash modes corresponding to each of the exposure compensation modes, said electronic flash mode setting means responsive to the selected exposure compensation mode from said exposure compensation means for setting an electronic flash mode corresponding to the selected exposure compensation mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing objects, features and attendant advantages of the present invention will be appreciated as the same become better understood by means of the following description and accompanying drawings, which are given by way of illustration only and thus are not limitative of the present invention, and wherein.

DETAILED DESCRIPTION OF THE INVENTION

Figure 1:
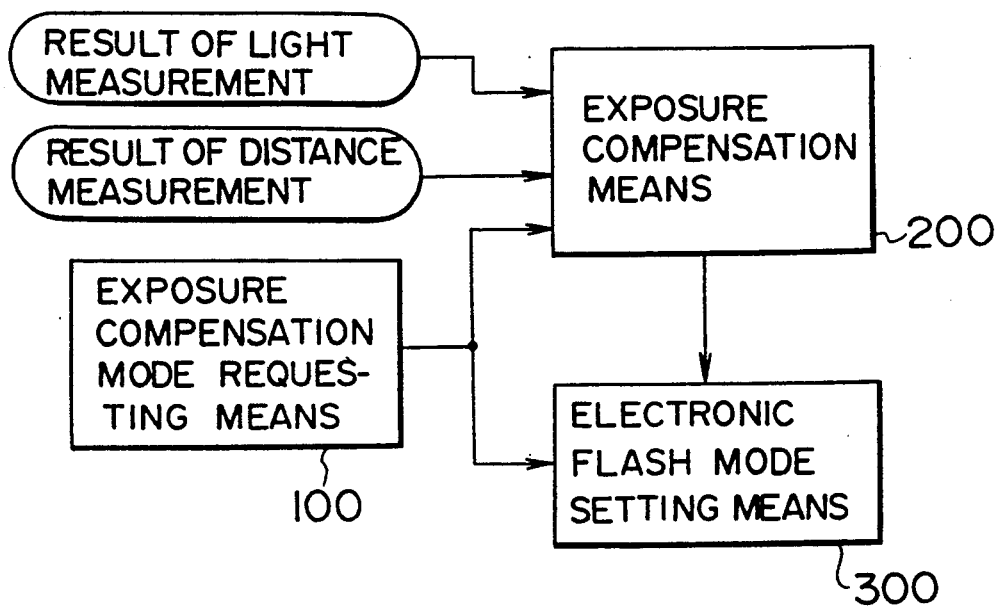
FIG. 1 is a block diagram showing a fundamental embodiment of an exposure compensation device of a camera according to the present invention.

In a fundamental embodiment of FIG. 1, exposure compensation mode requesting means 100, responsive to an external operation, supplies an exposure compensation mode request signal to exposure compensation means 200 and electronic flash mode setting means 300. The exposure compensation means 200 includes a plurality of exposure compensation modes. In each of these exposure compensation modes, there are stored precedently compensation values for compensating an exposure value and an electronic flashing point. The exposure compensation means 200, responsive to the exposure compensation mode request signal, selects a required exposure compensation mode based on a result of light measurement and a result of distance measurement, respectively, and compensates an exposure value and an electronic flashing point according to the results of light measurement and distance measurement by a compensation value corresponding to a selected exposure compensation mode. The exposure compensation means 200 also supplies the selected exposure compensation mode to the electronic flash mode setting means 300. The electronic flash mode setting means 300 includes preset electronic flash modes for each exposure compensation mode. The electronic flash mode setting means 300, responsive to the exposure compensation mode request signal and the selected exposure compensation mode, sets an electronic flash mode corresponding to the selected exposure compensation mode. According to a composition like this, when an exposure compensation mode is requested by an external operation, a required exposure compensation mode is selected based on the results of light measurement and distance measurement, the exposure value and the electronic flashing point are compensated according to a compensation value corresponding to the selected exposure compensation mode, and an electronic flash mode corresponding to the selected exposure compensation mode is set. Contents of the above-mentioned fundamental embodiment will be understood more clearly by means of a first preferred embodiment and a second preferred embodiment to be described in the following.

Figure 2:
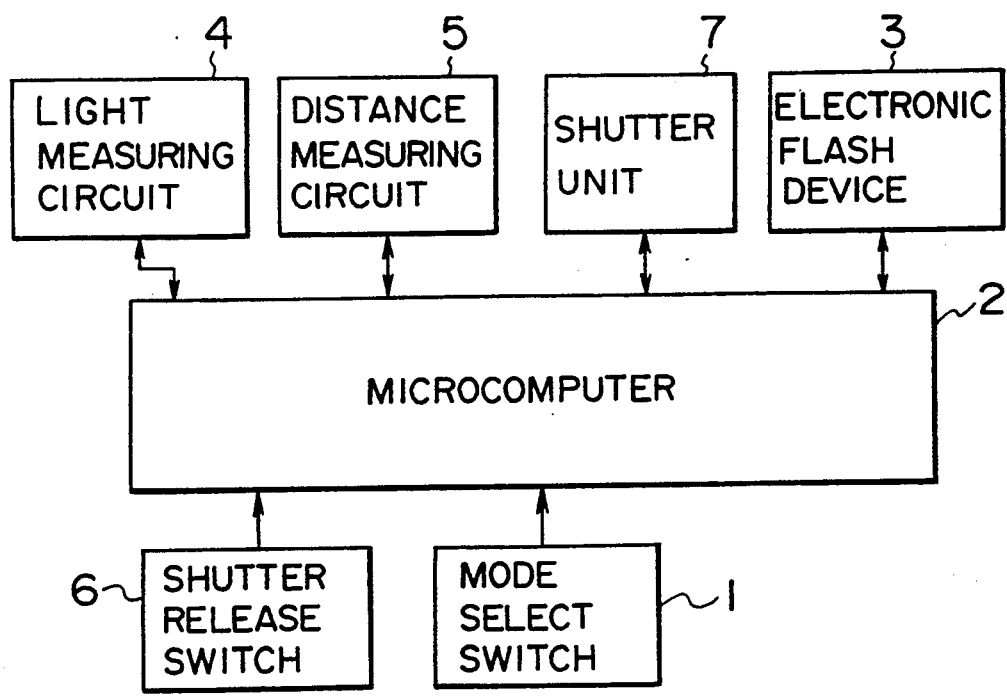
FIG. 2 is a block diagram showing a first preferred embodiment of an exposure compensation device of a camera according to the present invention.

In the first preferred embodiment of FIG. 2, a mode select switch 1 is a single push button switch, and supplies a mode select signal to a microcomputer 2 by each pushing operation. Modes which can be selected by pushing operation of the mode select switch 1 are five kinds. A first mode is an AUTO mode for flashing an electronic flash device 3 automatically when a field brightness is darker than a predetermined light value. A second mode is an ON mode for flashing the electronic flash device 3 regardless of the field brightness. A third mode is an OFF mode for prohibiting a flashing of the electronic flash device 3. A fourth mode is a PRE mode for preventing a red-eye phenomenon by flashing the electronic flash device 3 during an opening operation of a shutter, after flashing immediately before the opening operation of the shutter. A fifth mode is a exposure compensation mode. The microcomputer 2 sets each of these modes each time a mode select signal is given by a pushing operation of the mode select switch 1. In the present embodiment, each mode is set in order of the AUTO mode, the ON mode, the OFF mode, the PRE mode and the exposure compensation mode, to return from the exposure compensation mode to the AUTO mode.

A reference numeral 4 is a light measuring circuit for supplying a result of light measurement to the microcomputer 2, and a reference numeral 5 is a distance measuring circuit for supplying a result of distance measurement to the microcomputer 2.

In the present embodiment, the microcomputer 2 data corresponding to three types of exposure compensation mode as fixed data in a ROM. The three types of exposure compensation mode are a daylight portrait mode, a night scene portrait mode and a flower closeup mode, as shown in Table 1. The daylight portrait mode is an exposure compensation mode for taking a portrait in the daylight. The night scene portrait mode is an exposure compensation mode for taking a portrait under a night scene. The flower closeup mode is an exposure compensation mode for taking a closeup of a flower. The microcomputer 2, when an exposure compensation mode is set by the mode select switch 1, compensates an exposure value and an electronic flashing point according to the results of light measurement and distance measurement from the light measuring circuit 4 and the distance measuring circuit 5, and compensates the electronic flashing point (AV) by −1 in case of the daylight portrait mode, compensates the exposure value (EV) by −3 in case of the night scene portrait mode, and compensates both the exposure value (EV) and the electronic flashing point (AV) by −1 in the case of the flower closeup mode. The compensation values of the exposure value (EV) and the electronic flashing point (AV) on Table 1 are obtained experimentally, and it has been confirmed that, by compensation accordingly, a photograph with higher quality can be obtained in the daylight portrait, the night scene portrait and the flower closeup. The microcomputer 2, when an exposure compensation mode is set by the mode select switch 1, selects an exposure compensation mode based on the results of light measurement and distance measurement from the light measuring circuit 4 and the distance measuring circuit 5, and sets an electronic flash mode corresponding to the selected exposure compensation mode. The daylight portrait mode is selected when the result of light measurement from the light measuring circuit 4 is equal to or larger than a predetermined light value (LV=9, for example), the night scene portrait mode is selected when the result of light measurement is smaller than the predetermined light value, and the flower closeup mode is selected when the result of distance measurement is equal to or smaller than the predetermined distance value (1 m, for example), regardless of the result of light measurement. The electronic flash mode is set to the ON mode in case of the daylight portrait mode and the flower closeup mode, and the PRE mode in case of the night scene portrait mode.

TABLE 1

| Exposure compensation mode | EV | AV |
|---|---|---|
| Daylight portrait mode | 0 | −1 |
| Night scene portrait mode | −3 | 0 |
| Flower closeup mode | −1 | −1 |

A reference numeral 6 is a shutter release switch for supplying a release signal to the microcomputer 2, and a reference numeral 7 is a shutter unit under the control of the microcomputer 2.

Figure 3:
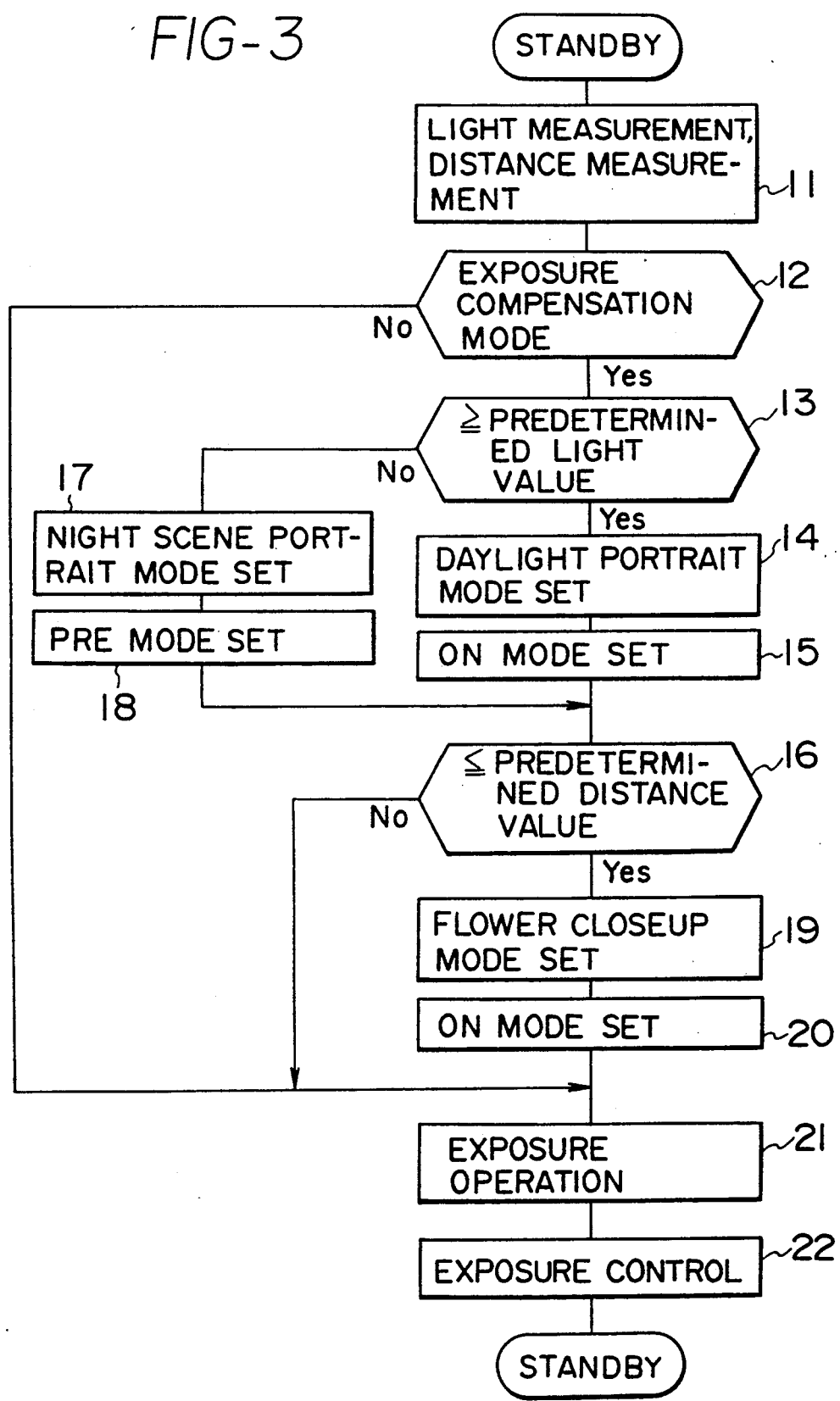
FIG. 3 is a flow diagram of a microcomputer of FIG. 2, showing processings to be executed by operating a shutter release switch.
Figure 4:
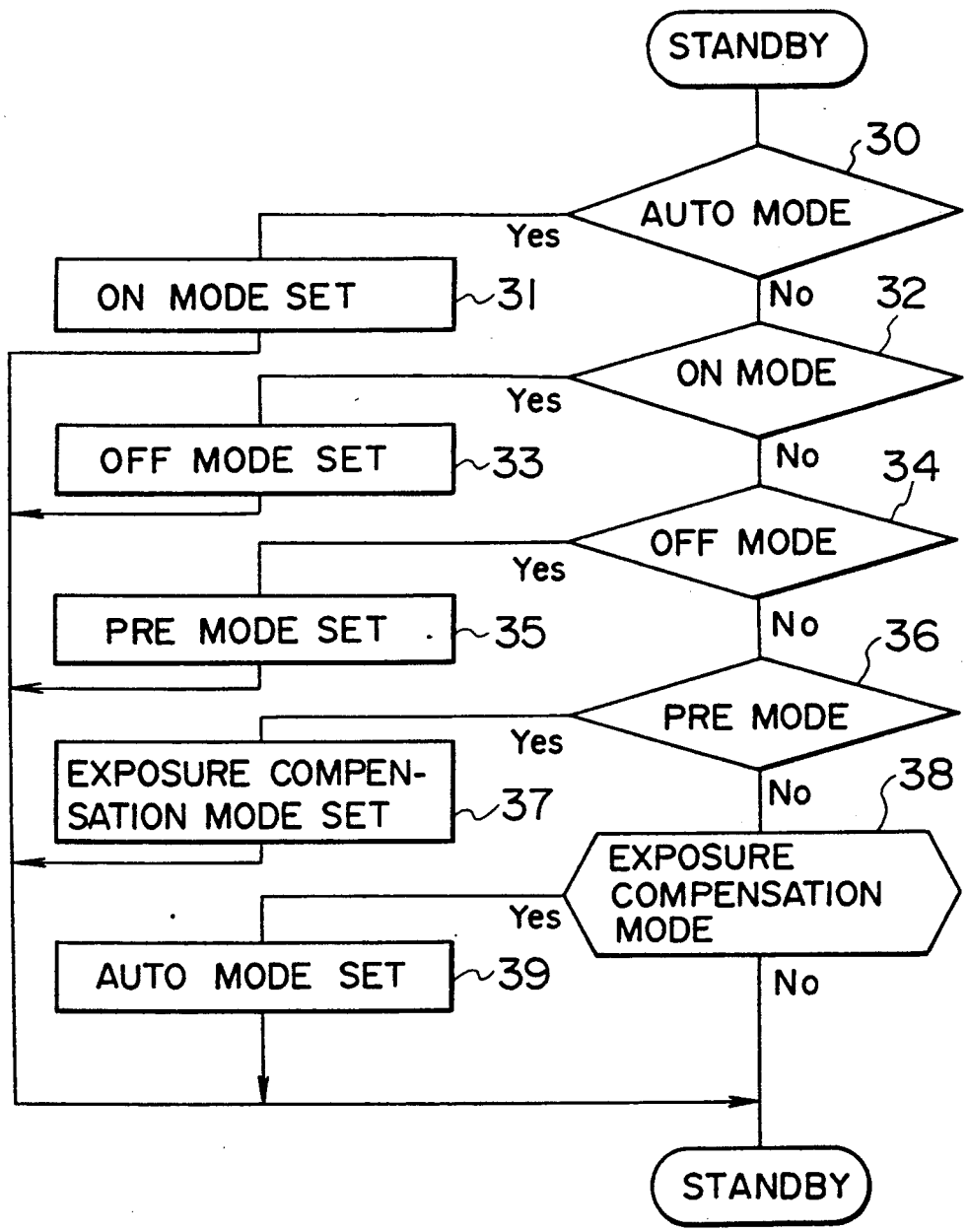
FIG. 4 is a flow diagram of a microcomputer of FIG. 2, showing processings to be executed by operating a mode select switch.

FIG. 3 and FIG. 4 are control flow diagrams of the microcomputer 2 of FIG. 2. The microcomputer 2 is set to a standby status when a main switch (not shown in the figure) is made on, executes a control of FIG. 3 when the shutter release switch 6 is operated, and executes a control of FIG. 4 when the mode select switch 1 is operated.

When the shutter release switch 6 is operated, the microcomputer 2 starts the control of FIG. 3, enters from the standby status into a light measurement and a distance measurement of a step 11 and, after inputting the results of the light measurement and the distance measurement from the light measuring circuit 4 and the distance measuring circuit 5, enters into step 12. In the step 12, the microcomputer 2 judges whether or not an exposure compensation mode is set by the mode select switch 1. The microcomputer 2, after judging that an exposure compensation mode is set in the step 12, enters a step 13 and judges whether the result of light measurement is larger or smaller than the predetermined light value. If the result of light measurement is equal to or larger than the predetermined light value, the microcomputer 2 sets the daylight portrait mode in a step 14 and, after setting the ON mode in a following step 15, enters a step 16. If the result of light measurement is smaller than the predetermined light value, the microcomputer 2 sets the night scene portrait mode in a step 17 and, after setting the PRE mode in a following step 18, enters the step 16. In the step 16, the microcomputer 2 judges whether the result of distance measurement is larger or smaller than a predetermined distance value. If the result of distance measurement is equal to or smaller than the predetermined distance value, the microcomputer 2 performs processings of steps 19 and 20. In the steps 19 and 20, the flower closeup mode and the ON mode are set instead of the exposure compensation mode and the electronic flash mode which are set in the steps 14 and 15 or in the steps 17 and 18. The microcomputer 2, after the processings in the step 19 and 20, enters a step 21. If the result of distance measurement is larger than the predetermined distance value in the step 16, the microcomputer 2 enters the step 21 without performing the processings of the step 19 and 20. The microcomputer 2, judging that an exposure compensation mode is not set in the step 12, enters directly from the step 12 into the step 21. In this case, an electronic flash mode which is set by a control of FIG. 4 mentioned later is retained. The microcomputer 2 executes the following processings in the step 21. First, the microcomputer 2 operates an exposure value and an electronic flashing point matching the results of light measurement and distance measurement. After that, the microcomputer 2, if in the daylight portrait mode, the night scene portrait mode or the flower closeup mode is set, reads compensation values of Table 1 corresponding to the set exposure compensation mode from the ROM. The microcomputer 2, compensating the exposure value and the electronic flashing point corresponding to the results of light measurement and distance measurement with the compensation values of Table 1 corresponding to the set exposure compensation mode, sets an exposure value and an electronic flashing point. If the daylight portrait mode, the night scene portrait mode or the flower closeup mode is not set, an exposure value and an electronic flashing point according to the results of light measurement and distance measurement are set. In a following step 22, the microcomputer 2 performs an exposure processing by controlling the shutter unit 7 and the electronic flash device 3 according to the set exposure value, the set electronic flashing point and the set electronic flash mode, and returns to the standby status.

When the mode select switch 1 is operated under the standby status, the microcomputer 2 starts the control of FIG. 4 and, after performing processings of steps 30, 31, 32, 33, 34, 35, 36, 37, 38 and 39 from the standby status, returns to the standby status. In the steps 30-39, the electronic flash mode is set each time the mode select switch 1 is operated by a rotation in order of the AUTO mode, ON mode, OFF mode, PRE mode and the exposure compensation mode to return to the AUTO mode. That is, if the mode select switch 1 is operated in the AUTO mode, the ON mode is set by processings of the steps 30 and 31; if the mode select switch 1 is operated in the ON mode, the OFF mode is set by processings of the steps 32 and 33; if the mode select switch 1 is operated in the OFF mode, the PRE mode is set by processings of the steps 34 and 35; if the mode select switch 1 is operated in the PRE mode, the exposure compensation mode is set by processings of the steps 36 and 37 and if the mode select switch 1 is operated in the exposure compensation mode, the AUTO mode is set by processings of the steps 38 and 39.

Figure 5:
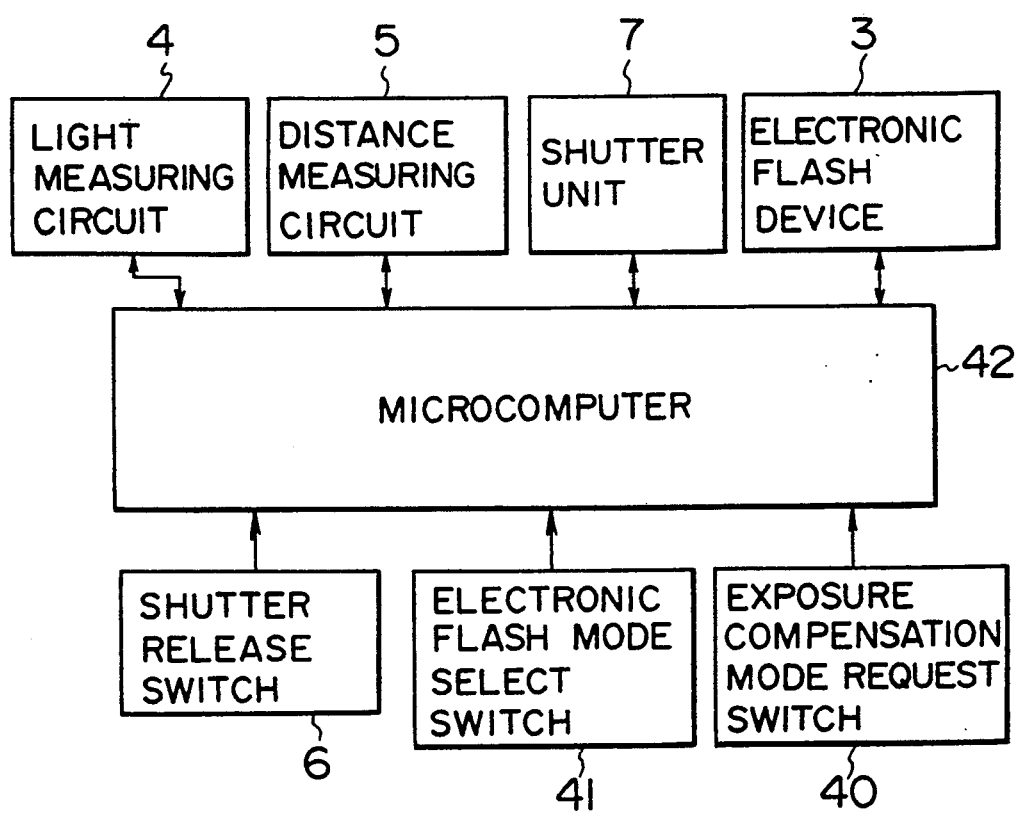
FIG. 5 is a block diagram showing a second preferred embodiment of an exposure compensation device of a camera according to the present invention.
Figure 6:
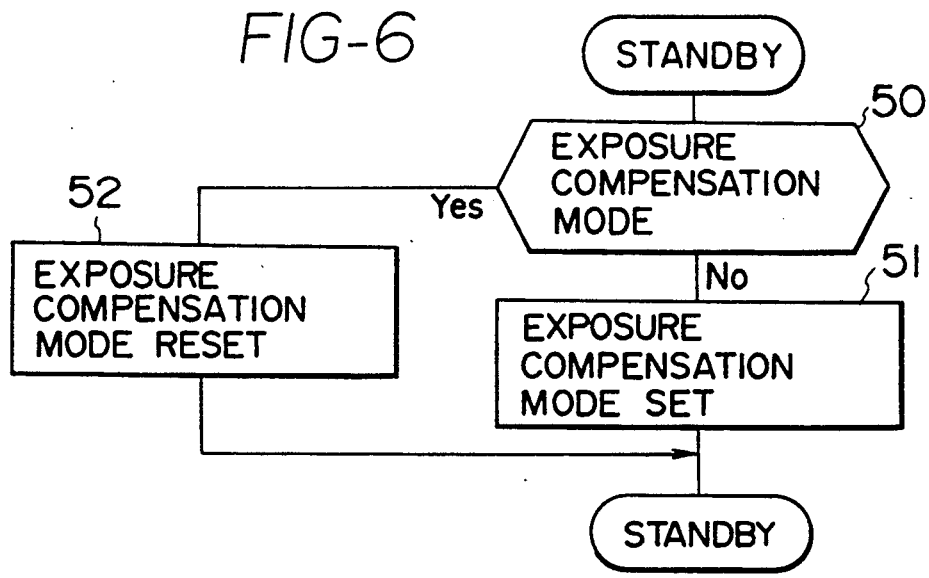
FIG. 6 is a flow diagram of a microcomputer of FIG. 5, showing processings to be executed by operating an exposure compensation request switch.
Figure 7:
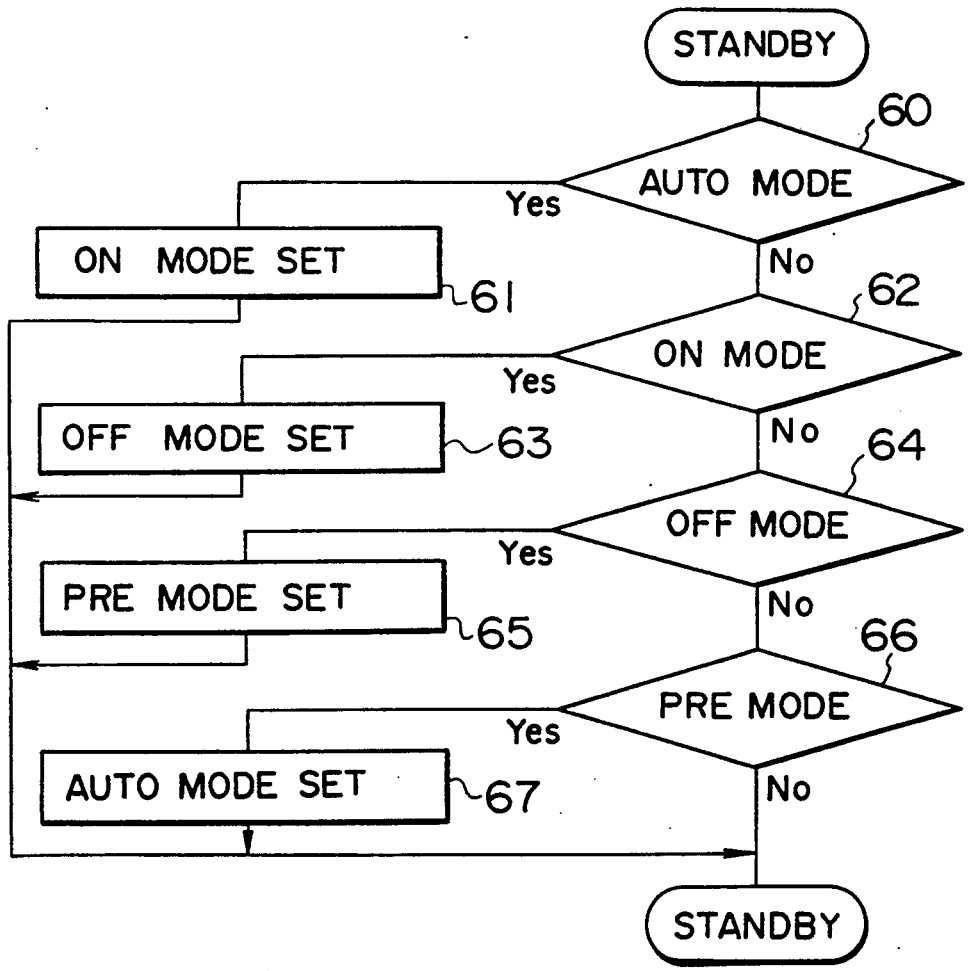
FIG. 7 is a flow diagram of a microcomputer of FIG. 5, showing processings to be executed by operating an electronic flash mode select switch.

FIG. 5 is a block diagram showing a second preferred embodiment. A composition of FIG. 5 has an exposure compensation mode request switch 40 and an electronic flash mode select switch 41 instead of the mode select switch 1 of FIG. 2 in the case of the first preferred embodiment. Moreover, a microcomputer 42 of FIG. 5 executes flow diagrams of FIG. 6 and FIG. 7 instead of the flow diagram of FIG. 4. The microcomputer 42, when the exposure compensation mode request switch 40 is operated, sets an exposure compensation mode according to the flow diagram of FIG. 6. The microcomputer 42, when the electronic flash mode select switch 41 is operated, selects an electronic flash mode according to the flow diagram of FIG. 7. The exposure compensation mode request switch 40 and the electronic flash mode select switch 41 are each a single push button switch. The microcomputer 42 repeats set/reset of the exposure compensation mode each time the exposure compensation mode request switch 40 is operated, and sets in order the electronic flash mode each time the electronic flash mode select switch 41 is operated. That is, when the exposure compensation mode request switch 40 is operated, the microcomputer 42 starts a control of FIG. 6 and, entering from a standby status into a step 50, judges whether or not the exposure compensation mode is a set status. If the exposure compensation mode is not the set status, the microcomputer 42 sets the exposure compensation mode in a step 51 and returns to the standby status. If the exposure compensation mode is the set status, the microcomputer 42 resets the exposure compensation mode in a step 52 and returns to the standby status. When the electronic flash mode select switch 41 is operated, the microcomputer 42 starts a control of FIG. 7 and, after performing processing of steps 60, 61, 62, 63, 64, 65, 66 and 67 from the standby status, returns to the standby status. In the steps 60-67, an electronic flash mode is set each time the electronic flash mode select sewitch 41 is operated by a rotation in order of the AUTO mode, the ON mode, the OFF mode and the PRE mode to return to the AUTO mode. The other composition is the same as the composition in the first preferred embodiment, and other controls are preformed according to the flow diagram of FIG. 3.

As described in detail, according to the present invention, in response to a request for an exposure compensation mode by an external operation, a required exposure compensation mode is selected based on a result of light measurement and a result of distance measurement, an exposure value and an electronic flashing point are compensated according to compensation values corresponding to the selected exposure compensation mode, and an electronic flash mode is set corresponding to the selected exposure compensation mode. Because of this, an operation of exposure compensation used jointly with an electronic flash can be simplified. And yet, as the contents of the exposure compensation used jointly with an electronic flash are changed automatically, handling with extreme ease results even for the camera user who is not familiar with nor experienced with a camera.

From the foregoing it will now be apparent that a new and improved exposure compensation device of camera has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An exposure compensation apparatus of a camera which is used with an electronic flash comprising:
   exposure compensation mode requesting means, responsive to an external operation, for requesting an exposure compensation mode;
   exposure compensation means having a plurality of exposure compensation modes in which a compensation value for compensating an exposure value and an electroic flashing point are set respectively, said exposure compensation means, being responsive to the request of an exposure compensation mode from said exposure compensation mode requesting means, for
   selecting a required exposure compensation mode based on results of a light measurement and a distance measurement, and
   compensating an exposure value and an electronic flashing point corresponding to the results of the light measurement and the distance measurement based upon the compensation value of the required exposure compensation mode; and
   electronic flash mode setting means, having electronic flash modes corresponding to each of the plurality of exposure compensation modes, said electronic flash mode setting means, being responsive to the required exposure compensation mode from said exposure compensation means, for setting an electronic flash mode corresponding to the required exposure compensation mode.

2. The exposure compensation apparatus of claim 1, wherein said exposure compensation mode requesting means comprises a single switch for selecting one of a manual selection electronic flash mode and a request for the exposure compensation mode.

3. The exposure compensation apparatus of claim 1, wherein said exposure compensation mode requesting means comprises a special switch for requesting the exposure compensation mode.

4. The exposure compensation apparatus of claim 1, wherein the plurality of exposure compensation modes of said exposure compensation means comprises a daylight portrait mode for taking a portrait in daylight, a night scene portrait mode for taking a portrait in a night scene and a flower closeup mode for taking a closeup of a flower.

5. The exposure compensation apparatus of claim 4, wherein said exposure compensation means comprises:
   means for selecting the daylight portrait mode when the result of the light measurement is larger than a predetermined light value and for selecting the night scene portrait mode when the result of the light measurement is smaller than the predetermined light value; and
   means for selecting the flower closeup mode instead of the daylight portrait mode and the night scene portrait mode when the result of the distance measurement is smaller than a predetermined distance value.

6. The exposure compensation apparatus of claim 4, wherein said exposure compensation means compensates the electronic flashing point by $-1$ upon selection of the daylight portrait mode, compensates the exposure value by $-3$ upon selection of the night scene portrait mode, and compensates both the exposure value and the electronic flashing point by $-1$ upon selection of the flower closeup mode.

7. The exposure compensation apparatus of claim 5, wherein said electronic flash mode setting means includes electronic flash modes comprising an ON mode for flashing the electronic flash regardless of a field brightness and a PRE mode for flashing the electronic flash during an opening operation of a shutter after flashing immediately before the opening operation of the shutter,
   said electronic flash mode setting means setting the ON mode when said exposure compensation means selects the daylight portrait mode or the flower closeup mode and setting the PRE mode when said exposure compensation means selects the night scene portrait mode.

8. An exposure compensation apparatus of a camera which is used with an electronic flash comprising:
   first means, responsive to a request of an exposure compensation mode, for selecting a required exposure compensation mode based on a result of a light measurement and a result of a distance measurement;
   second means, responsive to the required exposure compensation mode selected by said first means, for compensating an exposure value and an electronic flashing point based on the required exposure compensation mode; and
   third means, responsive to the required exposure compensation mode selected by said first means, for setting an electronic flash mode based on the required exposure compensation mode.

* * * * *